US011836678B2

(12) United States Patent
Westphal (10) Patent No.: US 11,836,678 B2
(45) Date of Patent: Dec. 5, 2023

(54) SYSTEM AND METHOD FOR MANAGING PRODUCT INVENTORY (71) Applicant: W.W. Grainger, Inc., Lake Forest, IL (US)

(72) Inventor: Geoffry A Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 74 days.

(21) Appl. No.: 17/516,024

(22) Filed: Nov. 1, 2021

(65) Prior Publication Data

US 2023/0134715 A1 May 4, 2023

(51) Int. Cl.
*G06Q 10/0875* (2023.01)

(52) U.S. Cl.
CPC .............................. *G06Q 10/0875* (2013.01)

(58) Field of Classification Search
CPC ........................ G06Q 10/0875; G06Q 10/087
See application file for complete search history.

(56) References Cited

U.S. PATENT DOCUMENTS

| | | | |
|---|---|---|---|
| 8,738,474 | B1 | 5/2014 | McHugh et al. |
| 10,366,365 | B2 | 7/2019 | Rimnac et al. |
| 2012/0043289 | A1 | 2/2012 | Brown et al. |
| 2020/0013003 | A1* | 1/2020 | Gao ........................ G01P 15/14 |
| 2021/0299849 | A9 | 9/2021 | Savage et al. |

FOREIGN PATENT DOCUMENTS

GB        2500375 A  *  9/2013  ............ G06F 21/00

OTHER PUBLICATIONS

D. Effa, P. Nieva, Z. Andrew and S. Lancaster, "Design and modeling of a MEMS accelerometer for a novel Virtual Button user interface," 2009 IEEE Toronto International Conference Science and Technology for Humanity (TIC-STH), Toronto, ON, Canada, 2009, pp. 597-602, doi: 10.1109/TIC-STH.2009.5444429. (Year: 2009).*

Ivan Miguel Pires, Pattern Recognition Techniques for the Identification of Activities of Daily Living Using a Mobile Device Accelerometer, Mar. 19, 2020, MDPI Journal, Electronics (Year: 2020).*

* cited by examiner

*Primary Examiner* — Allen C Chein
*Assistant Examiner* — Aaron N Tutor
(74) *Attorney, Agent, or Firm* — GREENBERG TRAURIG, LLP (57) ABSTRACT A method for providing automated inventory management in a system having a storage bin, an accelerometer system coupled to the storage bin, and an inventory management system communicatively coupled to the accelerometer system. An accelerometer of the accelerometer system generates a data representative of a movement of the storage bin and the system determines whether the generated data matches a data that is indicative of a replenishment needed event being performed upon the storage bin. The inventory management system initiates the replenishment of the product when replenishment is determined to be needed.

19 Claims, 7 Drawing Sheets

SYSTEM AND METHOD FOR MANAGING PRODUCT INVENTORY

BACKGROUND

Systems and methods for managing product inventory are generally known in the art.

U.S. Pat. No. 8,738,474 describes a system that has a storage bin used to hold a product and a product storage rack intended to hold the storage bin. The storage bin is provided with a near field communication (NFC) tag device and the product storage rack is provided with a NFC antenna device cooperable with the NFC tag device. The NFC antenna device and the NFC tag device are used to determine a relative position of or orientation of the storage bin relative to the product storage rack for the purpose of automatically determining if replenishment of the product within the product storage rack is required.

U.S. Pat. No. 10,366,365 describes a system and method adapted to monitor inventory of product within storage bins of a storage facility by mounting cameras to the storage bins. The cameras and a user processing device may be operably connected to a network such that the user processing device is in communication with the cameras. Further, the user processing device may search records of a database that correspond to product stored in the storage facility. Once a product of interest is identified, a location of the relevant storage bin may be provided to the user processing device, along with an image and/or video captured by the camera to show contents of the storage bin.

U.S. Published Application No. 2012/0043289 describes a storage bin that includes a body having a bottom wall and two opposed side walls, a front end wall of a first color, e.g., blue, and a rear end wall of a second color, e.g., red or orange, connected thereto. The two end walls have a height lower than a height of the side walls to form a front bin opening and a rear bin opening. A divider wall is positioned midway of the body to form a front hopper and a rear hopper, each of which is filled with a product. When the front hopper is empty and product in the bin needs replenishing, the bin is turned around so that the rear end wall of the second color faces outwardly to provide a visual indicator that replenishment of the product in the bin is needed while there is still product, e.g., safety stock, left in the rear hopper.

U.S. Published Application No. 2021/0299849 describes an access and storage system including a storage component configured to store items therein or thereon in an associated storage position. The storage component is configured to provide a user direct manual access to the items in the storage positions. The system further includes a sensor system configured to track at least one of the user's removal of an item from the associated storage position or replacement of an item to the associated storage position and an identification system for identifying the user. The system also has an authorization database operatively coupled to the identification system for tracking which of the items a particular identified user is authorized to access.

Each of these prior art references is incorporated herein by reference in its entirety.

SUMMARY

The following describes improved systems and methods for managing product inventory.

Generally, a system having a storage bin, an accelerometer system coupled to the storage bin, and an inventory management system communicatively coupled to the accelerometer system provides automated product inventory management. An accelerometer of the accelerometer system generates a data representative of a movement of the storage bin and the system determines whether the generated data matches a data that is indicative of a replenishment needed event being performed upon the storage bin. The inventory management system initiates the replenishment of the product when replenishment is determined to be needed. In some examples, the accelerometer system determines whether the generated data matches the data that is indicative of the replenishment needed event being performed upon the storage bin. In other examples, a cloud-based server, which may be a component part of the inventory management system, determines whether the generated data matches a data that is indicative of a replenishment needed event being performed upon the storage bin.

BRIEF DESCRIPTION OF THE DRAWINGS

For a better understanding of the systems and methods for managing product inventory described herein reference may be had to preferred embodiments shown in the following drawings in which.

DETAILED DESCRIPTION

With reference to the figures, example systems and methods for managing product inventory are now described.

Figure 1:
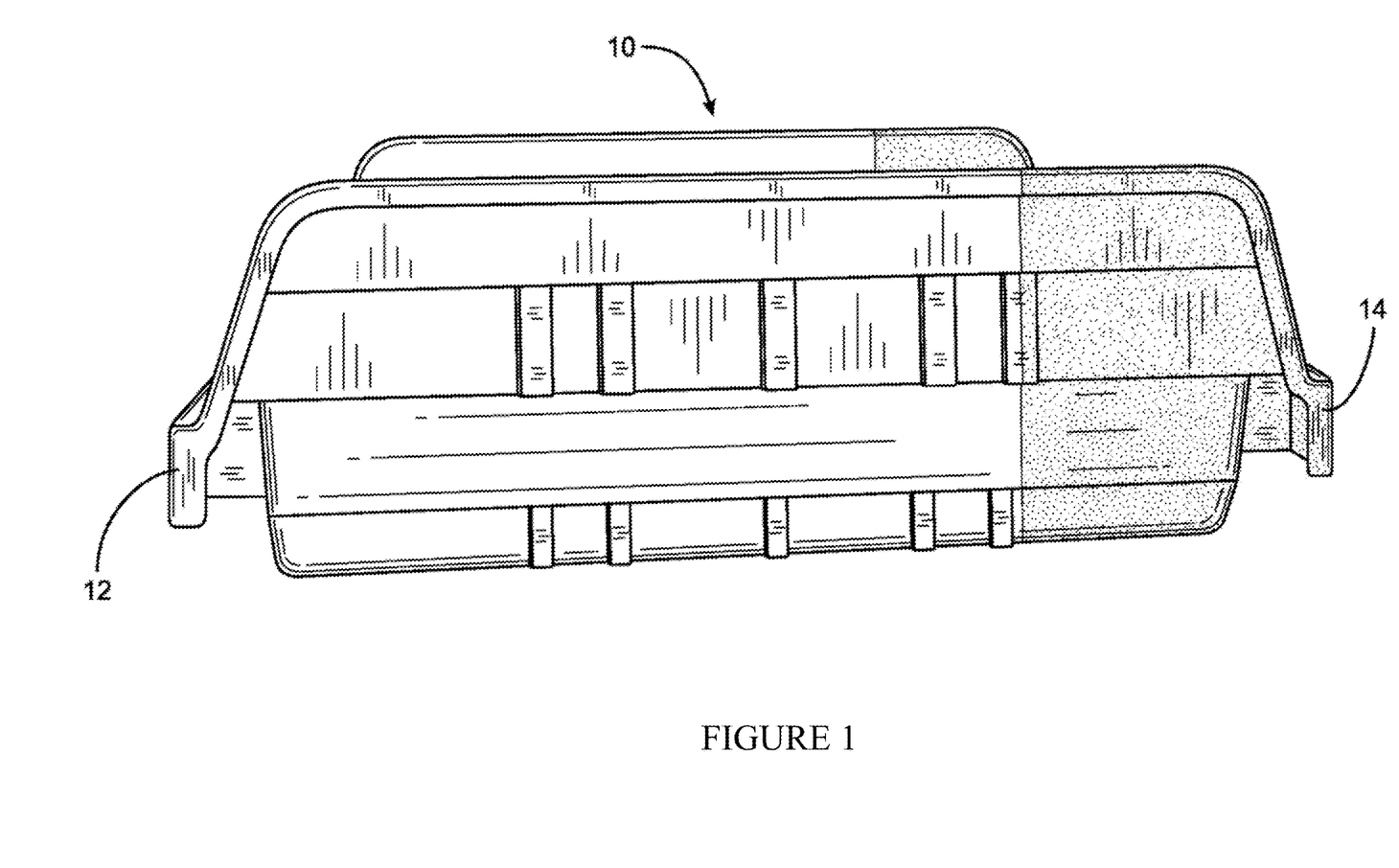
FIG. 1 is a side view of an example storage bin for use in connection with the subject systems and methods for managing product inventory.
Figure 2:
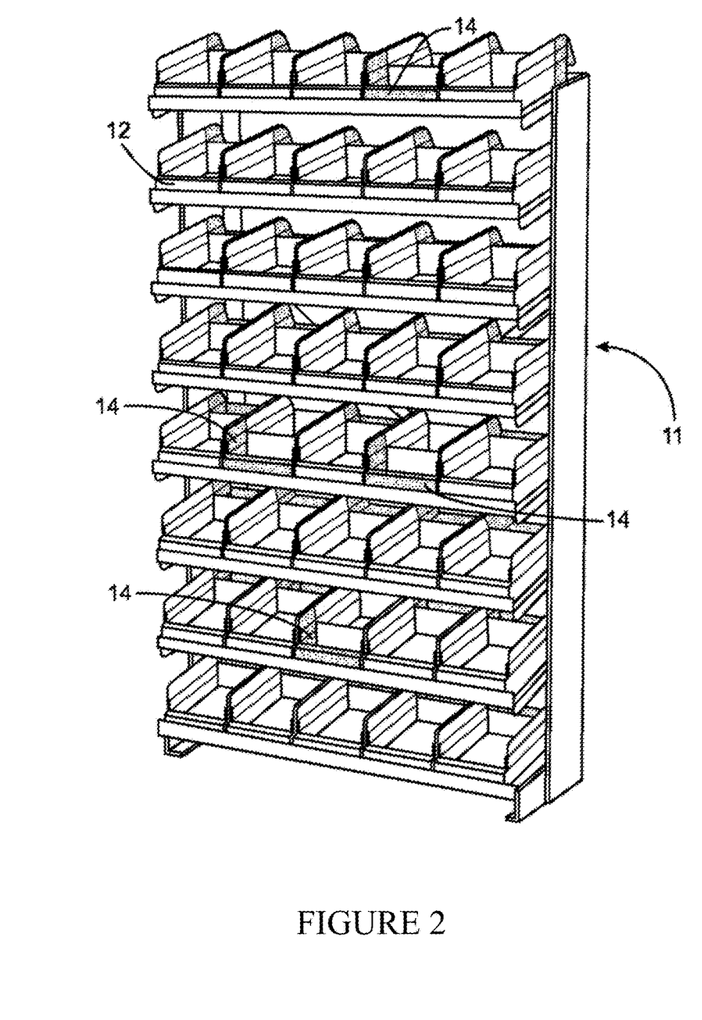
FIG. 2 illustrates storage bins of FIG. 1 disposed within an example product storage rack.

Turning to FIGS. 1 and 2, an example system including a bin 10 and a product storage rack 11 is illustrated. The example storage bin 10 generally comprises a body having a bottom wall and two opposed side walls, a front section including a front end wall 12 having a first indicium, e.g., a first color, text, absence of text, or the like, and a rear section including a second end wall 14 having a second indicium different than the first indicia, e.g., a second color, text, absence of text, or the like, connected thereto. A divider wall may be positioned intermediate the front section and the rear section of the body to form a front hopper and a rear hopper, each of which is to be filled with a product.

It is not required that the bin 10 be provided with a divider wall and/or that the end walls be provided with an indicium. However, providing the bin 10 with the divider wall and the indicium has the advantage described in the aforementioned U.S. Published Application No. 2012/0043289, namely, the advantage that, when the front hopper is empty and product in the front hopper of the bin 10 needs replenishing, the bin 10 is turned around in the bin holding rack 11 so that the rear end wall 14 of the second color faces outwardly to provide a visual indicator that replenishment of the product in the bin 10 is needed while there is still product left in the rear hopper of the bin 10. Thus, while such color coded and/or divided bins 10 may be preferred in certain system embodiments, it is to be understood that other bin forms can be used as needed while keeping within the spirit and scope of the systems and methods described herein.

When an inventory system relies upon a manual visual inspection of the product storage rack 11 in order to discern whether or not replenishment product is needed (e.g., an inventory system that uses color coded bins 10) costs in time and money are associated with the performance of such inspections. Thus, to reduce at least these costs, it is proposed that the bin 10 (whether color coded or not) be provided with an accelerometer system 18 whereby the inventory status of the bin 10 can be automatically discerned by the accelerometer system 18 and/or an inventory management system 21.

Figure 3:
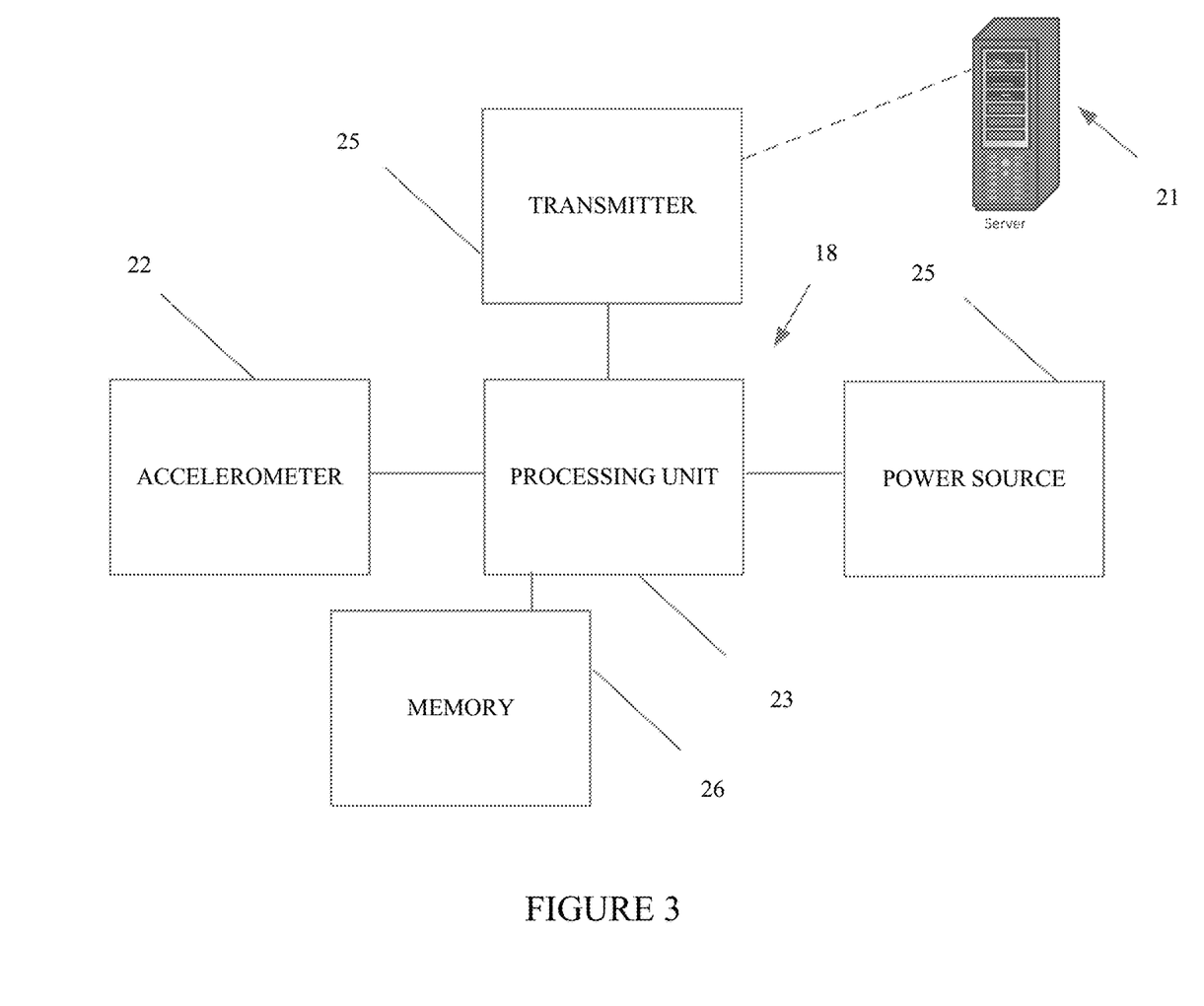
FIG. 3 illustrate an example accelerometer system used to provide data to an inventory management system.

For use in connection with automatically discerning the inventory status of the bin 10 the accelerometer system 18, which is preferably positioned on or embedded within the bin 10, is provided with one or more accelerometers 22, such as one or more micro electro mechanical system (MEMS) accelerometers, that is/are coupled to a processing unit 23. Preferably, the one or more accelerometers will be capable of detecting both the magnitude and the direction of forces applied to the bin 10, directly or indirectly, and can be used to sense orientation, coordinate acceleration, vibration, shock, and the like over multiple axes.

As additionally shown in FIG. 3, the accelerometer system 18 includes a power source 25 and a transmitter 24. The transmitter 24 is coupled to the processing unit 23 and is used to communicatively couple the accelerometer system 18 to the inventory management system 21. The power source 25 is coupled to the transmitter 24, the processing unit 23, and the accelerometer 22 and is used to provide power thereto, either directly or indirectly, as needed. The power source 25 is preferably in the form of a battery so that the accelerometer system 18 would remain operable even when the bin 10 is separated from/moved relative to the rack 11. In some instances, the battery could be rechargeable and the rack unit 11 could be provided with corresponding charging contacts, electromagnetic induction pads or an induction strip, etc. as appropriate. Separate charging stations could also be utilized. The transmitter 24 can be a wired and/or a wireless transmitter, e.g., the transmitter can be in the form of a USB port/plug, a BLE transmitter, an IR transmitter or the like as needed/appropriate to communicate with a corresponding receiver that can be positioned on the rack unit 11 and/or elsewhere within a facility to meet the given product tracking needs of a system user. It will also be appreciated that the accelerometer system 18 can be integrated into a single unit or can be created by combining multiple units as appropriate. A memory 26 associated with the processor 23 is utilized to store processor executable instructions and data as needed for the accelerometer system 18 to perform the various steps, in whole or in part, described herein.

In instances where the accelerometer system 18 is attached to a surface of the bin 10, the accelerometer system 18 can be applied to the bin 10 using any of a variety of form factors including, but not limited to, tags, stickers, key fobs, or the like. Furthermore, the accelerometer system 18, which may be read-only or externally rewriteable as desired (in which case a receiver or transceiver would be included as a part of the accelerometer system 18), preferably stores data in memory 26 that would be usable by the inventory management system 21 to identify the specific product that is being held within the bin 10 to which the accelerometer system 10 is connected. This data may be data that is indicative of a stock keeping unit (SKU) that is associated with the product held within the bin 10, data indicative of a bin number assigned to the bin 10, data indicative of a location for the bin 10 within the product storage rack 11, and/or the like as desired. The product identifying data is intended to be usable to, among other things, automatically initiate a replenishment of product within the bin 10 when needed. To this end, the inventory management system 21 will have an associated data repository which will cross reference product identifying data as would be received from an accelerometer system 18 with product replenishment details, such as a product identifier, replenishment amount, sourcing location, replenishment location, replenishment delivery method, replenishment delivery schedule, replenishment payment method, and/or the like as needed.

In operation, the accelerometer system 18 can be used to sense and report to the inventory management system 21 an occurrence of an event indicative of a user interaction with the bin 10, e.g., a user caused change in orientation or position of the bin 10. In addition or alternatively, the accelerometer system 18 can be used to sense and report to the inventory management system 21 an event indicative of a user interaction with product associated with the bin 10, e.g., the removing of product from (and possibly the adding of product to) the bin 10.

Figure 4:
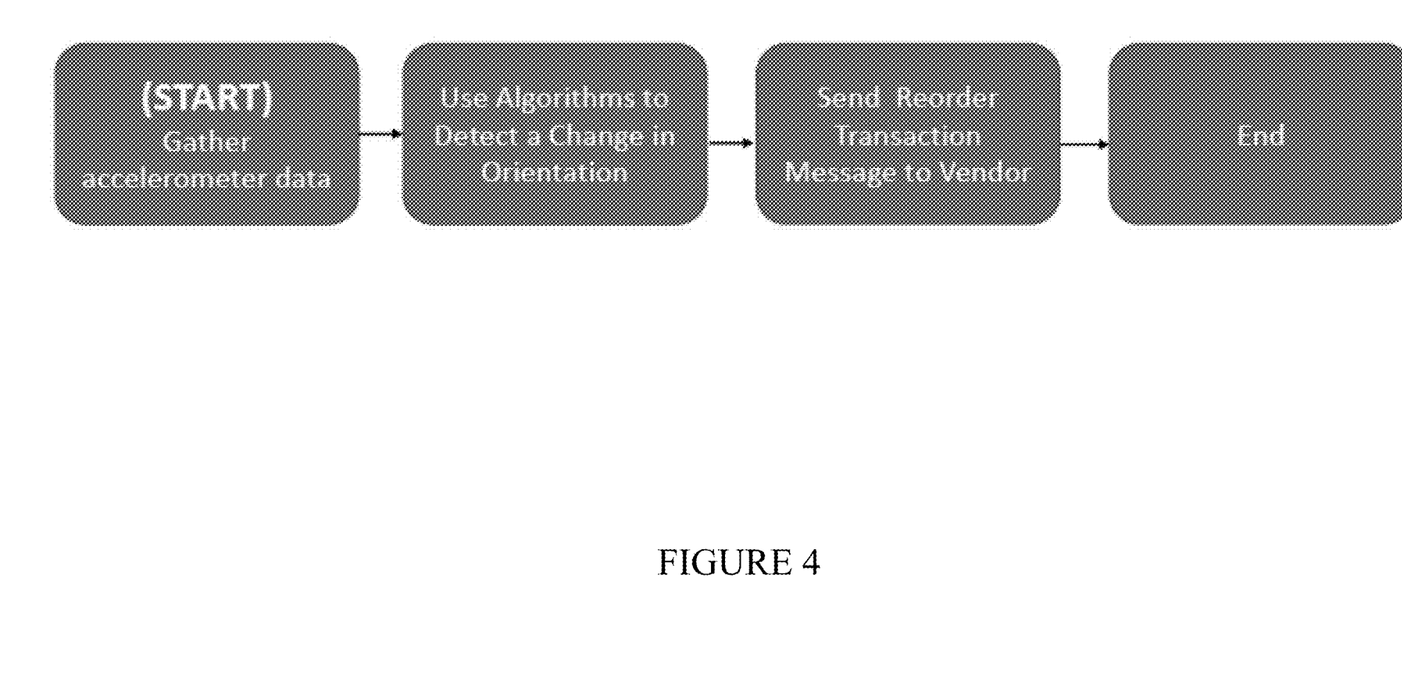
FIG. 4 illustrates an example method for using the accelerometer system of FIG. 3 to detect a bin reorientation and/or movement event for use in generating a product replenishment order.

By way of example with reference to FIG. 4, when the system is a system such as described in U.S. Published Application No. 2012/0043289, the accelerometer system 18 can cause a signal to be sent to the inventory management system 21 that indicates that the accelerometer system 18 sensed a "replenishment needed" turning of the bin 10 to which the accelerometer system 18 is coupled, e.g., a 180 degree turning of a color coded bin 10 in a horizontal plane. As noted, the signal sent to the inventory management system 21 will preferably have product identifying information to thereby allow the inventory management system 21 to respond to a receiving of the signal by initiating a corresponding product replenishment process. Similarly, if the system uses another bin movement process to indicate that the product needs to be restocked within the bin 10, such as a moving of the bin 10 to a designated replenishment indicating area such as a designated shelf of the rack 11, the accelerometer system 18 can sense the movement of the bin 10 to the designated replenishment indicating area and cause a signal to be sent to the inventory management system 21 that indicates that the accelerometer system 18 sensed a "replenishment needed" event as before.

In some instances, the system may require a user to move a bin 10 to simulate or train a "replenishment needed" event and the system 18 may store such information in memory 26 for comparison to the raw data obtained by accelerometer system 18 when the system in in replenishment monitoring use. The training may involve, for example, the movement of the bin 10 by a user to a designated replenishment indicating area of the rack 11. In this case, the accelerometer system 18 may be provided with a button or other input element to indicate to the system that a training of the system is being performed. In other cases, the accelerometer system 18 may be pre-programmed to recognize a simple replenishment indicating movement of the bin 10, such as a turning of the bin 10 in a horizontal plane on a shelf of the rack 11 at or about 180 degrees, and, as such, the user of the system 18 would not need to perform an explicit training of the system 18.

While the above describes a system in which the system 18 determines if a "replenishment needed" signal is to be sent to the management system 21, i.e., a system in which the accelerometer system 18 determines if the raw data obtained by the accelerometer system 18 matches (i.e., corresponds to the degree required) the data that indicates a "replenishment needed" event, it is to be understood that, in some instances, the accelerometer system 18 may simply send the raw data obtained by the accelerometer system 18 to the inventory management system 21, a cloud-server, or the like to thereby allow the inventory management system 21, the cloud-server, or the like to use the data to determine if a "replenishment needed" event has occurred and that product needs to be provided to replenish stock in a corresponding bin 10.

Figure 5:
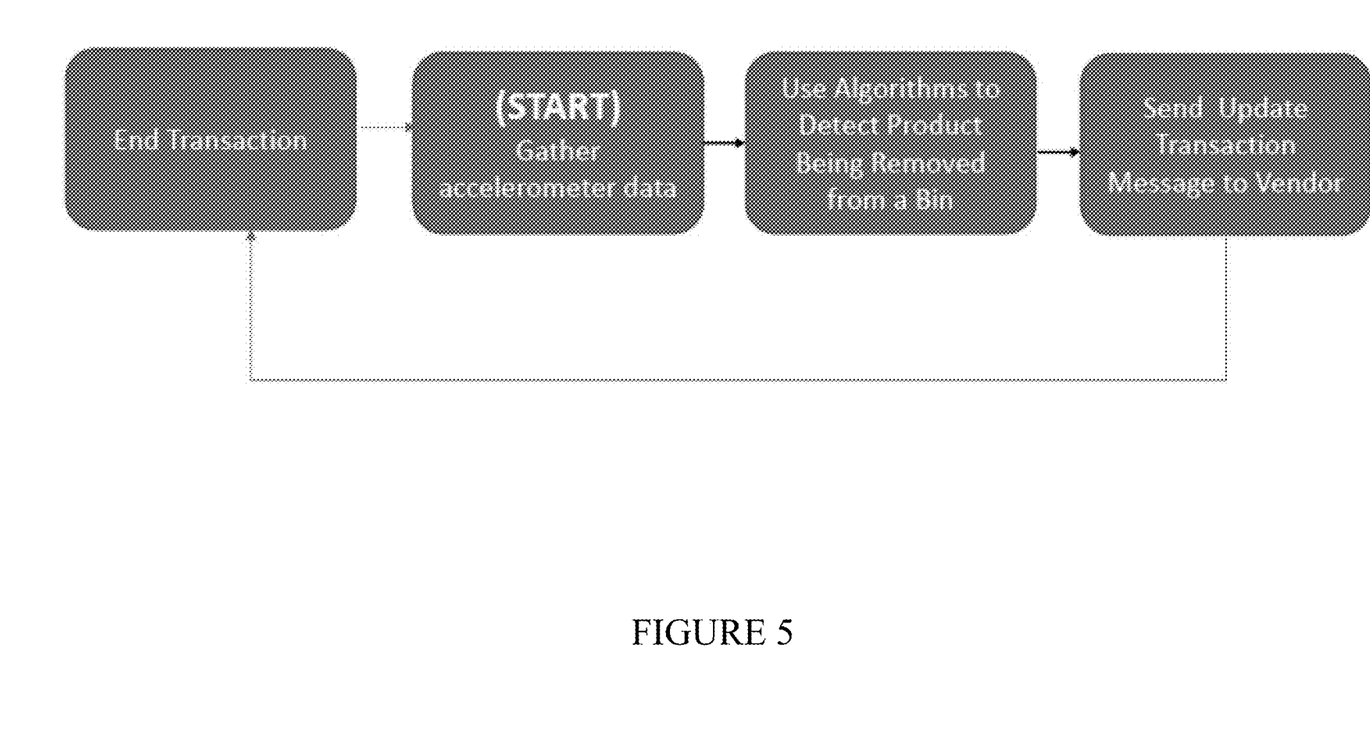
FIG. 5 illustrates an example method for using the accelerometer system of FIG. 3 to detect product being removed from a bin for use in generating a product replenishment order.

As to indicating a product interaction event, it is contemplated that the accelerometer system 21 can use data obtained via the accelerometer 22 to determine if a user has removed and or replaced product relative to the bin 10 as illustrated in FIG. 5. In this regard, raw movement data obtained by the sensor resulting from a user placing product into or removing product from a bin 10 can be used by the accelerometer system 18 (and/or by the inventory management system 21 when provided thereto) to determine the number/amount of product taken from or placed into a bin 10. As before, the analysis of the accelerometer data can be performed locally or in a distributed manner and the system may uses machine learning/AI to form sensed bin movement patterns that are indicative of such product removal or placement events for comparison against the raw data that is obtained by the accelerometer 22. In this regard, it will be appreciated that the AI training of the system will, among other things, allow the system to differentiate between movement of a bin 10 caused by environmental conditions, e.g., machinery caused vibrations of the rack 11, and movement of a bin 10 caused by a purposeful interaction with the contents of the bin 10 by a user.

In the event the system is not programmed to use the raw data obtained by the accelerometer system 18 to automatically determine an amount of product that has been placed into the bin 10, e.g., an amount of product that has been restocked, the system may require that a user manually indicate to the system either the exact amount of product added to the bin 10, indicate to the system that a known replenishment amount of product has been added to the bin 10, or the like. This input by be accomplished by the user interacting with the bin 10 in a predetermined manner, e.g., by providing a predetermined sequence of taps or the like to the bin 10 indicative of a replenishment having been performed (and possibly an amount) where the sequence of taps are capable of being sensed by the accelerometer system 18. The system will use the indicated replenishment amount as a starting point for determining when another replenishment of product will be needed as a result of the accelerometer system 18 determining that product is being removed from the corresponding bin 10.

Figure 6:
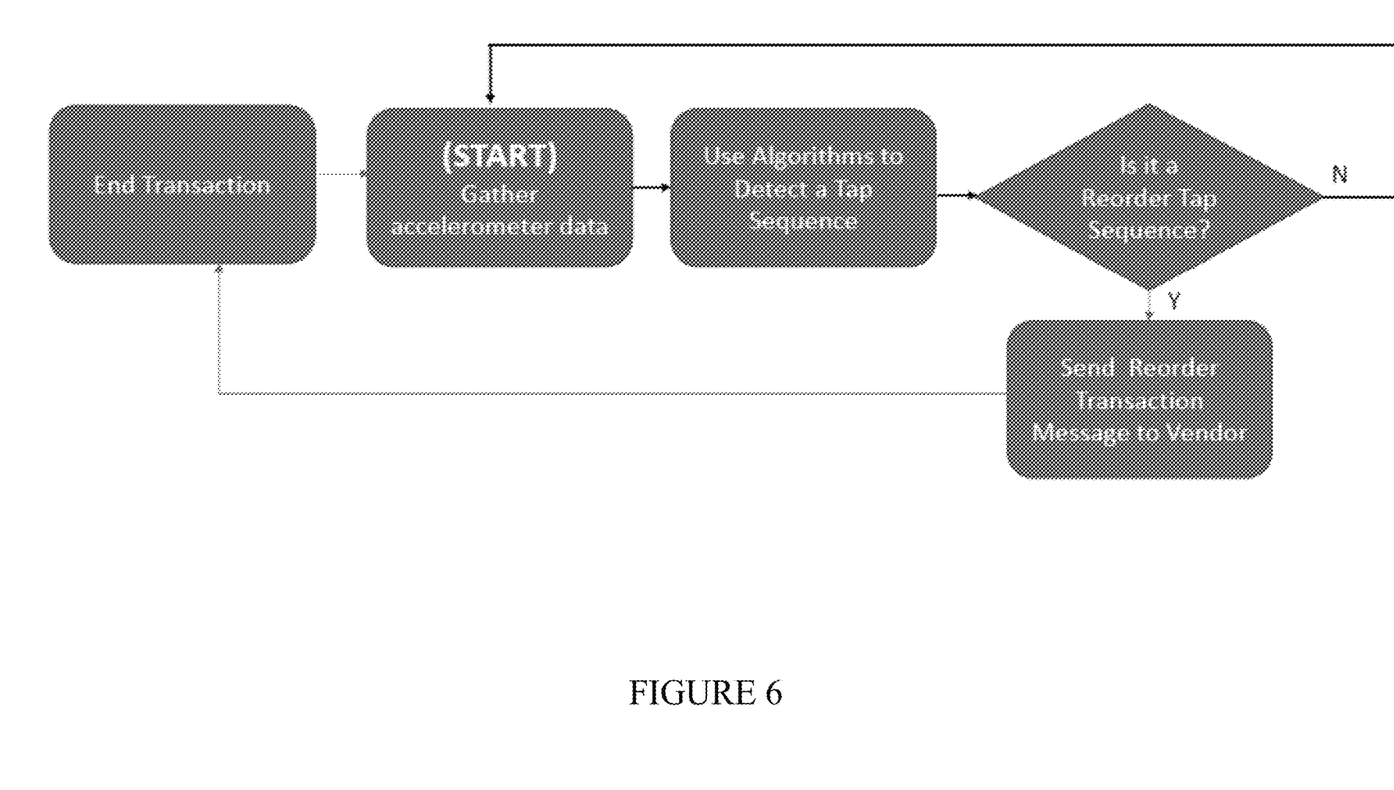
FIG. 6 illustrates an example method for using the accelerometer system of FIG. 3 to detect a reorder tap sequence provided to a bin for the purpose of generating a product replenishment order.

As noted, it is contemplated that the accelerometer system 18 can itself be used as an input device for the system. By way of further example as illustrated in FIG. 6, it is contemplated that a user can generate a reorder request at any time for a bin 10 by providing to the bin 10 a unique "reorder tap" sequence. This sequence, which would be sensed by the accelerometer system 10, can be used to instruct the accelerometer system 18 to send a "replenishment needed" signal to the inventory management system 21. Thus, this replenishment signal can be caused to be issued without the need to reorient the bin 10. It will also be appreciated that the raw data obtained by the accelerometer system 18 can be sent to a remote server for processing and/or that the "reorder tap" sequence can be programmed by the user and/or be pre-established as previously described. Similarly, it is to be appreciated that, when the accelerometer system 18 is used as an input device, a user can provide further tap sequence to a bin 10 for the purpose of indicating to the system that product is being removed from the bin 10 (and, as needed, the amount), to indicate that product has been replenished within the bin 10, to indicate the identity of the user, and the like without any limitation. Tap sequences may be required to be applied to a predetermined area of the bin 10 and/or in a predetermined direction upon the bin 10 to thereby allow the system to differentiate such taps from normal usage-based, accelerometer sensed movements of the bin 10, such as caused by a user reaching into the bin 10, movements caused by vibrations, etc. Tap sequences may additionally require a timing component for this same differentiation purpose.

Figure 7:
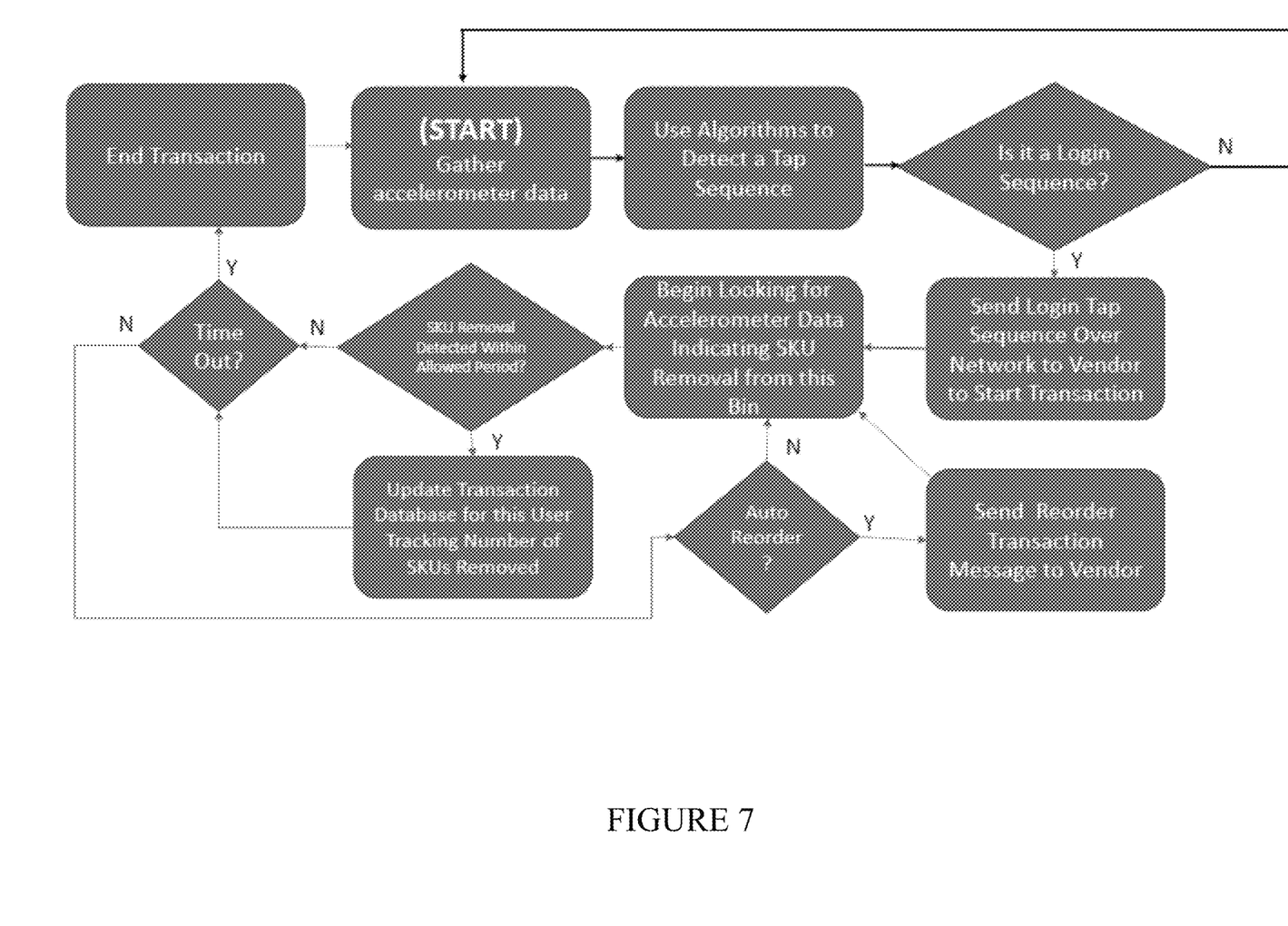
FIG. 7 illustrates an example method for using the accelerometer system of FIG. 3 to detect a user login tap sequence and to detect product being removed from a bin for use in generating a product replenishment order.

By way of further example, FIG. 7 illustrates a method wherein the accelerometer system 18 is usable to track who is taking product from a bin 10. The accelerometer system 18 and/or the inventory management system 21 may also time stamp the data so that the system may also know when the input was provided to the bin 10, e.g., when the product was removed from the bin 10. In the illustrated example, a user (e.g., a customer or OSA (Onsite Service Agent from the vendor)) can identify themselves to the system by providing a unique tap sequence upon a bin 10 (or the rack 11 in the event the accelerometer system 18 is capable of sensing such interaction with the rack 11). For example a user's tap sequence might be indicative of a user's ID or badge number (e.g., the user sequence is TAP, SMALL DELAY, TAP TAP, SMALL DELAY, TAP TAP which is recognized by the system as the equivalent of entering 122 on a keyboard). As described previously, a user can likewise provide their user identifying tap sequence to indicate that they are the user that is replenishing or returning product to a bin 10 server. A system operator can also configure the system such that multiple users share the same TAP sequence, in whole or in part, to represent that they all belong to a given cost center, or department, or project, or application, or location where product is going to be used.

In some instances, the system can include a feedback device, such as one or more LEDs that are a part of an accelerometer system 18, a rack 11, an associated app on a user device, etc., that can function to indicate to the user that the system has recognized the user and that the user can now remove product from a bin 10. The user feedback device can also be used to indicate a current status of a bin 10 and/or bins within a rack 11, the current status of any replenishment processing, and the like without limitation.

With the use of machine learning and AI, the system will be able to distinguish between various events. For example, the reports received from multiple sensing units 18 on multiple bins 10 and/or on multiple racks 11 could be used to distinguish between a meaningful event associated with a given bin and false events such as a purposeful movement of an adjacent bin, an inadvertent bumping of a rack, floor vibrations, etc. In addition, with the use of machine learning and AI, the system will also be able to determine with a high degree of accuracy how many items were removed from a bin 10. For example, if a bin 10 has bulk items, like bolts, the number of handfuls of product taken from a bin 10 can be determined and the remaining amount of product can be estimated by use of such machine learning and AI. The use of machine learning and AI can also be employed to help a customer understand product usage patterns.

In further examples, the system can be setup such that, when a recognized user is determined to have removed product from a bin 10, a text or email message can be sent using the network to anyone. For example, if a user is determined to have taken product from a bin 10, an email notification can be sent to their manager, or to a project leader, to a supervisor of/in an area of a factory, or to an employee of the vendor, etc. In addition, the system can provide feedback to a user using any of the aforementioned feedback mechanisms to indicate to a user that a restock request has been received by the vendor regardless of how a reorder request is generated, that an email has been sent, or of any other event being performed and/or being recognized by the system. In still further examples, data can be collected and sent (in real-time or in batch) to a vendor who administers the inventory system for analytics purposes, e.g., a vendor can use the data to propose product to be added to/removed from a rack 11, to determine how product/bins 10 are to be better arranged on a rack 11, or the like. To this end, because the system in able to track who took items, when, and how many/much, a heat map can be created to show where product hoarding or general usage is taking place at the customer's location and, as noted above, this information can be used by both the vendor and customer to tune the customer's business and reduce costs by guiding employees to take the proper amounts of product each time. Likewise, by tracking times, the system can estimate the amount of time a customer is taking to walk to the bins and how often and this collected information can also be used to help optimize bin placement at a customer's location. Yet further, it is contemplated that the bins 10 need not be stationary but can be placed on a mobile platform (with power) and follow customers around a project.

While various embodiments have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. An automated inventory management system, comprising:
   a storage bin; and
   an accelerometer system coupled to the storage bin;
   wherein the accelerometer system comprises an accelerometer, a transmitter, a processing device coupled to the accelerometer and the transmitter, and a memory storing prosecutor executable instructions, data representative of a product placed within the storage bin, and a data indicative of a replenishment needed event being performed upon the storage bin and the instructions, when executed by the processing device, cause the accelerometer system to perform steps comprising:
      determining that a first data obtained by the accelerometer matches a data that is indicative of an identity of a person;
      determining that a second data obtained by the accelerometer, distinct from the first data obtained by the accelerometer, matches the data that is indicative of a replenishment needed event being performed upon the storage bin; and
      in response to determining that the second data obtained by the accelerometer matches the data that is indicative of a replenishment needed event being performed upon the storage bin, causing a signal to be sent to a vendor system, the signal having the data representative of the product placed within the storage bin and a data that indicates to the vendor system a determined occurrence of the replenishment needed event and the person identified by the first data as having initiated the replenishment event.

2. The system as recited in claim 1, wherein the data indicative of the replenishment needed event being performed upon the storage bin comprises a data indicative of a 180 degree turning of the storage bin in a horizontal plane.

3. The system as recited in claim 1, wherein the data indicative of a replenishment needed event being performed upon the storage bin comprises a data indicative of a sequence of taps being provided to the storage bin.

4. The system as recited in claim 1, wherein the data that is indicative of an identity of a person comprises a data indicative of a sequence of taps being provided to the storage bin.

5. The system as recited in claim 1, wherein the data indicative of the replenishment needed event being performed upon the storage bin comprises a data indicative of a movement of the storage bin to a predetermined location.

6. The system as recited in claim 5, wherein the instructions, when executed by the processing device, cause the accelerometer system to be placed into a training mode for capturing the data indicative of the movement of the storage bin to the predetermined location.

7. The system as recited in claim 6, wherein the accelerometer system comprises one or more accelerometers for sensing movement in directions along multiple axes.

8. A method for providing automated inventory management in a system comprising a storage bin, an accelerometer system coupled to the storage bin, and an inventory management system communicatively coupled to the accelerometer system, the method comprising:
   generating by an accelerometer of the accelerometer system a data representative of a movement of the storage bin;
   determining that the data generated by the accelerometer of the accelerometer system matches a data that is indicative of a replenishment needed event being performed upon the storage bin; and
   in response to determining that the data generated by the accelerometer of the accelerometer system matches the data that is indicative of a replenishment needed event being performed upon the storage bin, causing the inventory management system to initiate a replenishment of the product at the storage bin;
   wherein the data indicative of the replenishment needed event being performed upon the storage bin comprises a data indicative of a first sequence of taps being provided to the storage bin.

9. The method as recited in claim 8, wherein the accelerometer system performs the step of determining that the data generated by the accelerometer of the accelerometer system matches the data that is indicative of the replenishment needed event being performed upon the storage bin and the accelerometer system provides to the inventory management system a signal that includes data representative of the product to cause the inventory management system to initiate the replenishment of the product at the storage bin.

10. The method as recited in claim 8, wherein the accelerometer comprises one or more accelerometers for sensing movement in directions along multiple axes.

11. The method as recited in claim 8, further comprising using a second sequence of taps provided to the storage bin to identify a person to be associated with the replenishment needed event.

12. An automated inventory management system, comprising:
  a storage bin; and
  an accelerometer system coupled to the storage bin;
  wherein the accelerometer system comprises an accelerometer, a transmitter, a processing device coupled to the accelerometer and the transmitter, and a memory storing prosecutor executable instructions, data representative of a product placed within the storage bin, and a data indicative of a replenishment needed event being performed upon the storage bin and the instructions, when executed by the processing device, cause the accelerometer system to perform steps comprising:
  determining that a data obtained by the accelerometer matches the data that is indicative of a replenishment needed event being performed upon the storage bin; and
  in response to determining that the data obtained by the accelerometer matches the data that is indicative of a replenishment needed event being performed upon the storage bin, causing a signal to be sent to a vendor system, the signal having the data representative of the product placed within the storage bin and a data that indicates to the vendor system a determined occurrence of the replenishment needed event;
  wherein the data indicative of a replenishment needed event being performed upon the storage bin comprises a data indicative of a sequence of taps being provided to the storage bin.

13. A method for providing automated inventory management in a system comprising a storage bin, an accelerometer system coupled to the storage bin, and an inventory management system communicatively coupled to the accelerometer system, the method comprising:
  generating by an accelerometer of the accelerometer system a first data representative of a first movement of the storage bin;
  generating by an accelerometer of the accelerometer system a second data representative of a second movement of the storage bin different than the first movement of the storage bin;
  determining that the first data generated by the accelerometer of the accelerometer system matches a data that is indicative of an identity of a person;
  determining that the second data generated by the accelerometer of the accelerometer system matches a data that is indicative of a replenishment needed event being performed upon the storage bin; and
  in response to determining that the data generated by the accelerometer of the accelerometer system matches the data that is indicative of a replenishment needed event being performed upon the storage bin, causing a signal to be sent to a vendor system, the signal having the data representative of a product placed within the storage bin and a data that indicates to the vendor system a determined occurrence of the replenishment needed event and the person identified by the first data as having initiated the replenishment event.

14. The method as recited in claim 13, wherein the second movement of the storage bin results from a user removing an amount of the product from the bin and the data indicative of the replenishment needed event being performed upon the storage bin comprises a data indicative of a total threshold amount of the product being removed from the storage bin.

15. The method as recited in claim 13, wherein the data that is indicative of an identity of a person comprises a data indicative of a sequence of taps being provided to the storage bin.

16. The method as recited in claim 13, wherein the data indicative of the replenishment needed event being performed upon the storage bin comprises a data indicative of a 180 degree turning of the storage bin in a horizontal plane.

17. The method as recited in claim 13, wherein the accelerometer comprises one or more accelerometers for sensing movement in directions along multiple axes.

18. The method as recited in claim 13, wherein the data indicative of the replenishment needed event being performed upon the storage bin comprises a data indicative of a movement of the storage bin to a predetermined location.

19. The method as recited in claim 18, further comprising causing the accelerometer system to be placed into a training mode for capturing the data indicative of the movement of the storage bin to the predetermined location.

* * * * *